May 22, 1928.                L. ILLMER                1,670,890
                           WASHER DEVICE
                         Filed Oct. 22, 1926
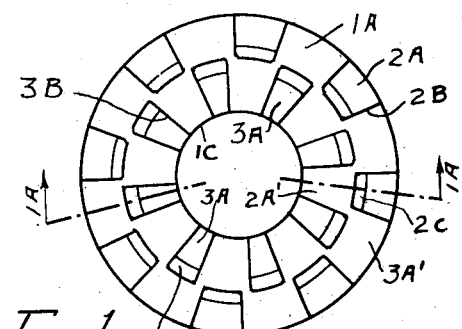
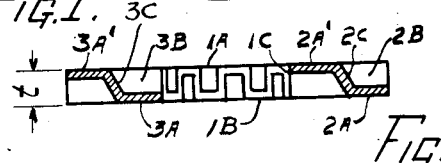
Fig. 1.    Fig. 1A.
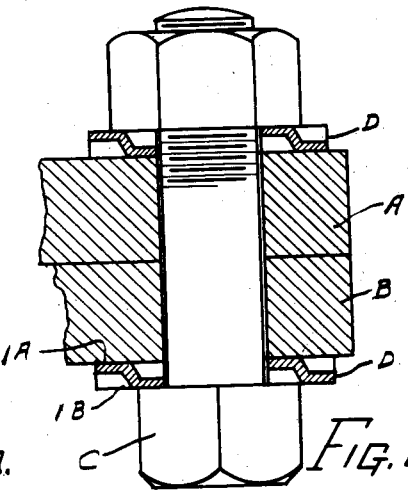
Fig. 2.
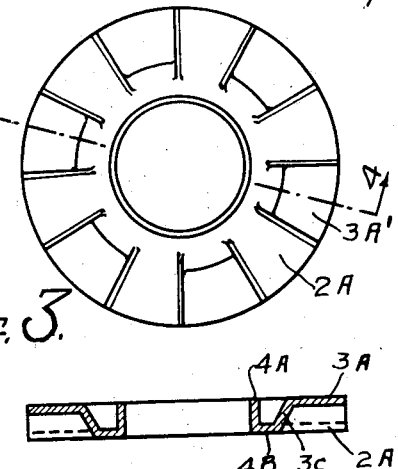
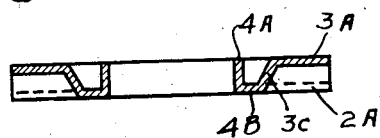
Fig. 3.    Fig. 4.
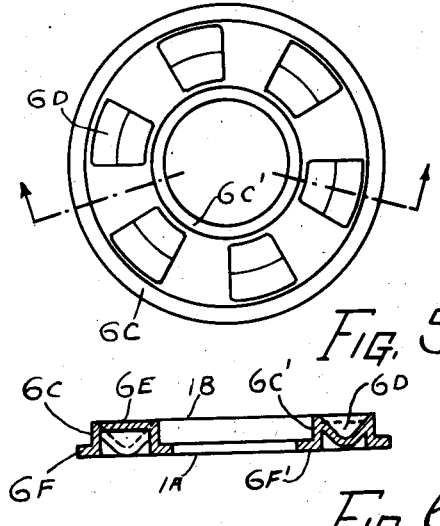
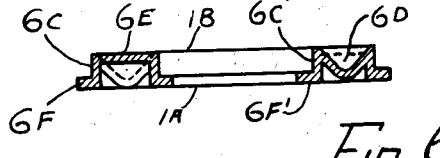
Fig. 5.    Fig. 6.
INVENTOR
Louis Illmer.

Patented May 22, 1928.

1,670,890

UNITED STATES PATENT OFFICE.

LOUIS ILLMER, OF CORTLAND, NEW YORK.

WASHER DEVICE.

Application filed October 22, 1926. Serial No. 143,437.

My invention relates to improvements in the art of washers and more particularly to such perforated metal discs of the relatively rigid type as are ordinarily used beneath a nut, bolt head or other similar screw fastening means for the purpose of allowing the nut load to be properly distributed over the bolted working parts.

A primary object is to provide for a suitable washer of this character adapted to bring about a substantial reduction in weight of material over that heretofore needed to meet these requirements. The common practice is to stamp washers out of relatively heavy sheet metal in the form of a plain perforated disc whose overall thickness in the finished article remains substantially equal to that of the sheet metal from which they are fabricated, while in the present device, it is contemplated to utilize a hollow box or truss-girder washer formation; for any given diametral dimension, this improved type may be made of thinner sheet metal than applies to the conventional washer, and this thinner metal is then corrugated or fluted in a novel manner in order to impart thereto a large measure of inherent transverse rigidity, to the end that such fluted washer may be made to carry the full bolt load and distribute the same over the clamped working part without undue dishing or other abnormal distortions.

It is preferred to resort to two groups or rows of interspaced sector-like flat pads respectively aligned with the opposite washer sides and these pads are disposed in staggered or interposed relation around the washer aperture. The contiguous radial sector edges of the respective pad groups are inturned and integrally connected to constitute primary webs extending between the washer sides; these radial or spoke-like girder members are in turn given a lateral bracing effect by means of auxiliary chordwise webs adapted to partly or wholly surround the washer axis.

The invention also includes certain structural modifications and comprises various other features, all of which will be more fully set forth hereinafter.

Reference is had to the accompanying one sheet drawing which illustrates a specific embodiment of my invention, like characters of reference refer to like parts in the several views, and in which drawings:

Figure 1 is a plan view of an improved hollow washer provided with radially disposed indented corrugations or flutes between the opposite side faces thereof, while Figure 1A is a cross-sectional view taken along the broken line 1A—1A of Figure 1.

Figure 2 shows said washer disposed under both the bolt head and the nut as applied to drawing together two plate members or the like.

Figure 3 illustrates a modified form of washer in that the washer aperture is provided with a concentric reinforcing ring and with plural radial flutes extending to the washer periphery.

Figure 4 is cross-sectional view taken along the line 4—4 of Figure 3.

Figures 5 and 6 indicate certain further modifications in the disposition of reinforcing web members of my washer and in this instance two concentric flanged rings are resorted to and these are in turn interconnected by a plurality of radially disposed flutes or indentations.

Referring first to Figures 1 and 1A, these illustrate an annular reinforced washer or disc of the truss-girder type preferably fabricated from sheet metal or casting whose mean gauge thickness is thinner than that of the overall finished washer thicknesses "$t$". The two disc sides 1A and 1B are spaced by said distance "$t$" and these are provided with an aligned bolt hole or other centrally disposed aperture 1C. Said disc sides may be indented or corrugated by stamping methods or otherwise, to form a series of alternately disposed shallow flutes or washes sector elements. Of these, the outer radial flutes may each comprise a flat disc sector face or contact pad 2A which is shown as lying adjacent to the lower washer side 1B and extending out to the periphery thereof. This particular type of flute indentation may be given a partial box shape having complementary inturned radial or primary webs disposed in spoke-like fashion such as 2B and a transverse brace or auxiliary web wall element 2C which also extends between said sides 1A and 1B and is disposed chordwise with respect to said primary webs. The inner flute is here formed similarly but in reverse direction and comprises a disc sector or contact pad 3A which is shown as extending into the washer aperture 1C and as having complementary cross-walls such as 3B and also an offset web wall element 3C. While the lower contact face of both pads 2A and 3A lie in the plane of the side 1B, the set of complementary pads 2A' and 3A' are spaced therefrom and made to lie in the plane of the upper side face 1A.

It will be observed that the plural pad indentations 2A and 3A respectively alternate and that the corresponding reversed web walls 2C and 3C are interconnected endwise and arranged to virtually constitute a closed ring shaped girder or auxiliary reinforcing member extending cross-wise between the parallel washer faces and around the washer axis. Such ring-like formation imparts greater rigidity to the washer as compared to that afforded by a plain disc of corresponding gauge thickness when used without the described radial flutes or other lateral reinforcing means.

The application of my improved washer is shown in Figure 2 where said devices are disposed on both sides of the working plates A and B and these are clamped together by means of the bolt C. The washer here designated as D may be identical with that previously described and is likewise intended to present a series of spaced surface pads on each of its side faces 1A and 1B, and this feature practically renders the washer reversible. As shown in Figure 1, the shallow face indentations provided for the surface 1B may be made somewhat larger in aggregate void spaces or gaps between its plural contact pads than applies to the opposite face 1A. This greater pad pitch in the broken surface 1B is more readily bridged by the bolt member while as indicated, it is preferred to place the face 1A against the plates A or B. Should either of these plates be made of relatively soft material such as wood or the like, the washer might become partially or wholly embedded therein, whereupon the entire washer surface ultimately would come into play to resist crushing and better distribute its full quota of load. In the case of metal plates, there would be no perceptible embedding but owing to the rigid box-like internal structure designed to keep said contact pads properly spaced, the full bolt load may be carried without abnormal crushing effects. It is preferred to radially dispose said disc flutes and to interconnect the various pad faces by means of a system of truss-girder members for the reason that such disposition provides for a greater degree of lateral stiffness in resisting dishing effects on part of the washer.

It may be expedient but not essential to further reinforce the spaced washer contact pads by more than one concentric corrugation similar in disposition to the ring shaped web or girder element 2C and 3C previously described. Such a second ring member is preferably fashioned into a lateral reinforcement placed closely around the washer aperture in the manner indicated by 4A in Figures 3 and 4.

Figures 5 and 6 show a further modification of ring elements in that two such endless concentric girder members 6C and 6C' are used and these are cross-connected by a series of spaced radial indentations such as 6D. The rings 6C and 6C' virtually form the legs of a cross-sectionally cup shaped section of which the flat crown or top pads 6E lie adjacent to the side face marked 1B while the leg ends of said cup shape are respectively turned outwardly to constitute the foot elements 6F and 6F' and serve as endless contact pads for this modified type of washer.

The described modifications broadly embody similar underlying reinforcing principles in so far as the improved disposition of metal makes the described washer more rigid against lateral flexure; for any given overall disc dimensions, my improved washer affords a holding power substantially equal to that of the conventional washer but at a considerable reduction in metal requirements, especially so as applied to larger washer sizes where the resulting monetary saving naturally becomes more pronounced.

It is further pointed out that for sake of clearness in disclosure, the sheet metal as portrayed in the drawings, is shown thinner than would be expedient to use in practice, and it is preferred to keep the described indentations relatively shallow with a view of bringing about a weight reduction of somewhere in the neighborhood of one half of the conventional solid disc type of washer.

Obviously the described reinforcing methods are subject to a rather wide variation in application and it will be understood that I do not wish to be limited to the specific embodiments set forth herein as an example of my improvements, since various changes in structure, shape and other co-ordinated arrangements may be resorted to without departing from the spirit and scope of the present invention as herein described and more particularly defined in the appended claims.

I claim—

1. In a relatively rigid apertured washer-like member having spaced opposite sides and fabricated from material whose mean thickness is less than the aforesaid side spacing, said sides being oppositely indented to shape said material into truss-girder formation adapted to shape up two complementary groups of interspaced sector-like pad faces respectively aligned with said opposite washer sides and disposed in a radially staggered relation having the contiguous edges of the respective interposed pads integrally interconnected by web means arranged in spoke-like fashion.

2. In a relatively rigid apertured washer-like member having spaced opposite sides and stamped from sheet metal whose mean thickness is less than the aforesaid side spacing, said sides being oppositely indented by complementary pad sector elements adapted to align with the opposite washer sides in a radially staggered relation having the contiguous edges of the respective interposed pad faces inturned toward each other and interconnected to impart augmented rigidity to the washer against transverse dishing.

3. In an apertured washer-like member having spaced opposite sides and fabricated from material whose mean thickness is less than the aforesaid side spacing, said sides being oppositely indented to shape up two complementary groups of interspaced sector-like pad faces respectively aligned with the opposite washer sides and disposed in a radially staggered relation, the contiguous edges of such interposed pads being interconnected by primary web means arranged in spoke-like fashion, and auxiliary web means laterally bracing said primary means and disposed in chord-wise fashion thereto.

4. In an apertured washer-like member having spaced opposite side faces and fabricated from material whose mean thickness is less than the aforesaid face spacing, said side faces being fluted radially with respect to the aperture to shape up two complementary groups of interposed sector-like pad faces respectively aligned with the opposite washer sides and disposed in radially staggered relation with the contiguous edges of such interposed pads inturned toward each other and interconnected to constitute spoke-like primary webs which cooperate with auxiliary chordwise web means to impart augmented transverse rigidity to said washer against dishing flexure.

5. In an apertured washer-like member having spaced opposite sides and fabricated from material whose mean thickness is less than the aforesaid side spacing and one of which sides is fluted with a plurality of spaced indentations extending toward the outer edge thereof while the other side is fluted with a plurality of indentations extending inwardly toward the washer aperture, said last named flutes being interposed between the first named flutes.

6. In an apertured washer-like member having spaced opposite sides and fabricated from material whose mean thickness is less than the aforesaid side spacing, a plurality of radially disposed flute-like indentations for one of said sides to shape up a group of interspaced sector-like pad faces the respective radial edges of which are inturned toward the opposite washer side to constitute spoke-like web reenforcements, and a cooperating web-like member disposed in chordwise fashion between certain of said spoke-like webs.

7. In an apertured washer-like member having spaced opposite sides and fabricated from sheet metal whose mean thickness is less than the aforesaid side spacing and one of which sides is indented to shape up a group of interspaced sector-like pad faces of which the respective radial edges are inturned toward the opposite washer side to form primary spoke-like web members, and an auxiliary web element disposed transversely with respect to each pair of the aforesaid spoke-like webs and adapted to surround the washer aperture and extend between said opposite sides for lateral reinforcing purposes against transverse dishing of the washer.

8. In an apertured washer-like member having spaced opposite sides and fabricated from material whose mean thickness is less than the aforesaid side spacing, said sides being broken up by spaced indentures or gaps to form contact pad faces adapted to align with the respective sides and which indentations in one of the sides are radially disposed and each limited to a partial or incomplete circumferential gap.

In testimony whereof, I have herewith set my hand this 20th day of October, 1926.

LOUIS ILLMER.